April 9, 1935.  F. A. HALLECK  1,996,763
VALVE MECHANISM
Filed Dec. 26, 1931

Inventor:
Frank A. Halleck.
by Luis A. Maxson.
Atty.

Patented Apr. 9, 1935

1,996,763

UNITED STATES PATENT OFFICE 1,996,763

VALVE MECHANISM

Frank A. Halleck, Chicago, Ill., assignor to Sullivan Machinery Company, a corporation of Massachusetts Application December 26, 1931, Serial No. 583,374

9 Claims. (Cl. 230—231)

My invention relates to valve mechanisms and more particularly to automatic flow-controlled valve mechanisms for pumps or air compressors.

An object of my invention is to provide an improved valve mechanism. Another object of my invention is to provide an improved valve mechanism of the type in which an inlet valve mechanism and a discharge valve mechanism are arranged coaxial with the cylinder in substantially concentric relation to each other. A further object of my invention is to provide an improved valve mechanism in which, upon removal of the cylinder head, access to the valve mechanism proper may be readily attained. A still further object of my invention is to provide an improved valve mechanism and cylinder construction whose parts are so related that the discharge connections for the cylinder need not be disturbed in order to enable access to the parts of the valve mechanism proper. Other objects and advantages of my invention will hereinafter more fully appear.

Figure 1:
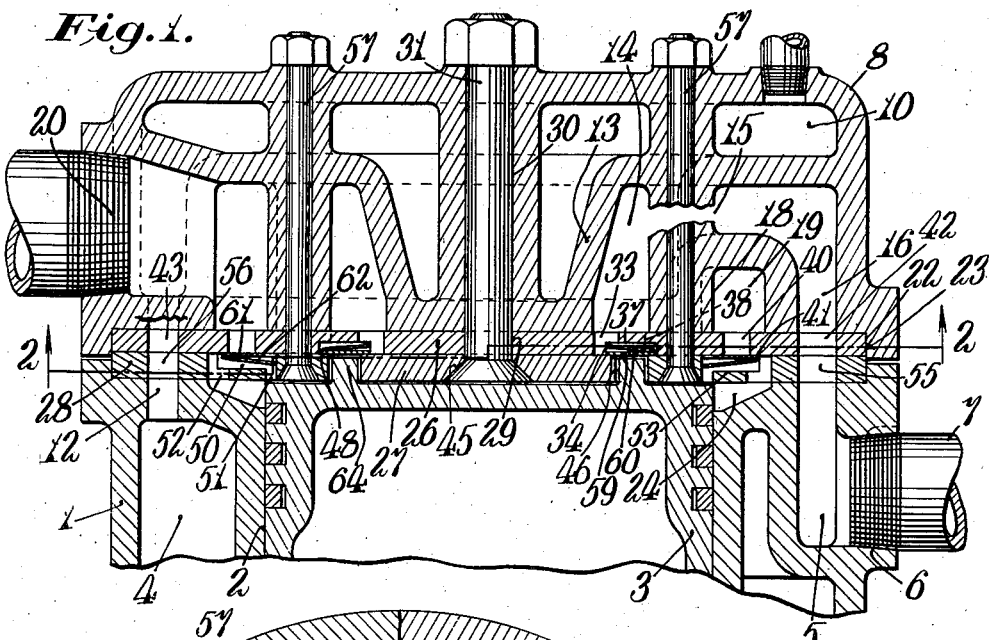
Figure 2:
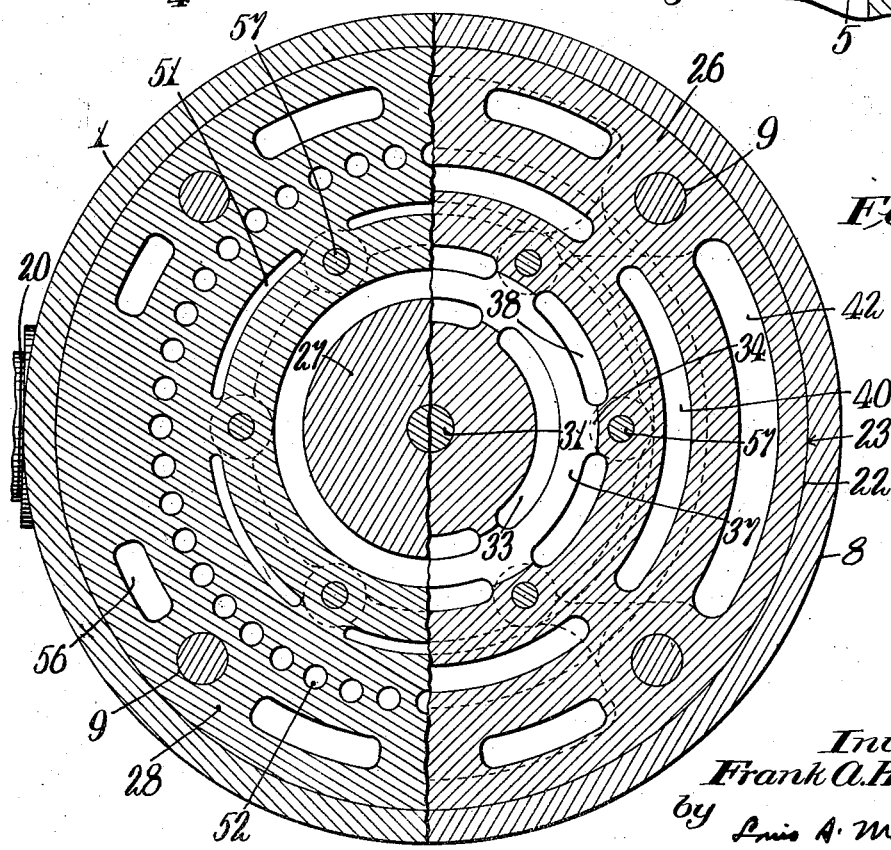

In the accompanying drawing in which one embodiment of the invention is shown for purposes of illustration, Fig. 1 is a special section through the head end of a pump cylinder in which an illustrative form of my invention is embodied;

Fig. 2 is a transverse section on the plane of the broken line 2—2 of Fig. 1.

For purposes of illustration, I have shown my improved pump valve mechanism arranged in an air compressor. This compressor comprises a cylinder 1 in whose bore 2, a piston 3 is reciprocable. This cylinder may be the only cylinder of the compressor or may, for example, be one of a series of radially extending cylinders of a radial type compressor. The cylinder 1 has a water jacket 4 and at one side is a discharge space 5, having a discharge outlet for the compressed fluid at 6. A delivery line 7 for the compressed fluid is herein shown as threadedly connected to the outlet 6.

The cylinder 1 carries a cylinder head 8 which may be secured to the cylinder by any suitable means, as for example, by studs extending through openings 9. The cylinder head 8 has a water jacket 10 formed in it. The head jacket 10 and the cylinder jacket 4 are connected by a passage 12. The cylinder head has a central water cooled boss like portion 13 which is surrounded by an annular discharge passage 14 which communicates through a radially extending passage 15 with a connection 16 in line with the discharge space 5 in the cylinder. The discharge space 14 is bounded on its outer side by a wall 18 which is surrounded by an annular intake space 19 which receives fluid from an intake connection 20.

The abutting ends of the cylinder member 1 and cylinder head 8 are recessed to provide a chamber 22 for a valve mechanism which is generally designated 23 and which comprises both inlet and discharge valve devices. The outer end of the cylinder member is bored larger at 24 to facilitate flow of fluid relative to the valve mechanism, but by reason of the shallowness of this counter boring the clearance is not materially affected.

The valve mechanism 23 comprises a plate 26 nearer to the cylinder head and a pair of plates 27 and 28 nearer to the cylinder proper. The plate 26 has a bore 29 at its center which alines with a bore 30 in the boss 13 of the cylinder head, and through these bores 29 and 30, a bolt 31 extends as later described. Spaced radially from the bore 29 in the plate 26 is an annular series of flow passages or ports 33 with which, at their outer edges, an annular valve and spring receiving recess 34 communicates. This recess extends only partially through the plate 26, opens through the side of the plate toward the cylinder and is bounded by a guard surface 37. A second annular series of arcuate ports numbered 38 opens into the space 34 at the outer side of the latter. The annular series of arcuate ports 33 and 38 open into the discharge space 14. Still further radially spaced from the bore 29 is an annular series of arcuate inlet ports 40 which open completely through the plate 26 and communicate at their outer ends with the annular intake space 19 while having their inner ends surrounded by an annular valve seat surface 41. Still further spaced radially from the axis of the plate 26 is a passage 42 communicating with the delivery space 16 and adapted to form a part of the connection between the latter and the delivery space 5 in the cylinder member 1. Passages 43 are also provided to form a portion of the connection between the head jacket 10 and cylinder jacket 4.

The plate 27 has a countersunk recess 45 at its inner or cylinder side, and this receives the head of the bolt 31 which holds the plate 27, the plate 26 and the cylinder head 8 firmly together. At its outer edge, the plate 27 provides a surface 46 which forms the inner half of the discharge valve seat.

The plate 28, at its inner edge, provides a surface 48 spaced outwardly from the surface 46, but in the same plane with the latter, and this surface forms the outer half of the discharge valve seat. Nearer to its outer edge, the plate 28 is provided with an inlet valve recess 50 which communicates through an inner annularly arranged series of arcuate passages 51 with the cylinder bore, and through an arcuately arranged series of holes 52 with the counterbore space 24. A guard surface 53 is arranged between the passages 51 and holes 52, opposite to the inlet ports 40 and inlet valve seat 41. A discharge conducting passage 55 is formed to aline with the passage 42 and complete with the latter the connection between the head discharge space 16 and the cylinder discharge space 5. Passages 56 are also provided in an arcuate series to aline with passages 43 to complete the cooling fluid connection between the head jacket 10 and cylinder jacket 4. A series of bolts 57 connect the plate 28, and further connect the plate 26 to the head member 8. Within the discharge valve recess 34 there is arranged an annular discharge valve member 59 and a suitable spring 60 which, as shown herein, may take the form of a transversely bowed annular spring member guided by contact with the walls of the discharge valve recess. An inlet valve 61 and inlet valve spring 62 are arranged in the inlet valve space 50. The piston 3 has an annular boss 64 on its outer end adapted to enter the space between plates 27 and 28, thereby reducing the clearance volume.

It will be evident that I have provided, in this form of mechanism, a very convenient combined inlet and discharge valve arrangement for a pump or air compressor, in which three plates, all securely held to the cylinder head member, provide the necessary passages and valve recess spaces for the complete control of the normal pumping operations of the mechanism. It will be evident that the valves are safely housed within spaces formed between the plates. It will be evident, moreover, that if desired, access may be had to the inlet valve mechanism while the discharge valve and valve spring are retained in position by the plate 27. It will further be apparent that this improved valve mechanism may be removed without disturbing the delivery connection for the pumped fluid, and thus, in the case of a radial compressor, little complication will be encountered in the disassembling of the parts for inspection or repair.

While I have in this application specifically described one form which my invention may assume in practice, it will be understood that this form of the same is shown for purposes of illustration and that the invention may be modified and embodied in various other forms without departing from its spirit or the scope of the appended claims.

Cross reference is hereby made to my application Ser. No. 583,373 of even filing date herewith.

What I claim as new and desire to secure by Letters Patent is:

1. In combination, in a valve mechanism, a combined inlet and discharge valve structure including a plate forming a valve seat, a plurality of coaxial plates cooperating in forming another valve seat, and valves cooperating with said seats.

2. In combination, in a valve mechanism, a plurality of coaxially arranged plates cooperating to form an arcuate port and to provide a valve seat comprising valve seating surfaces at radially opposite sides of the port, plate means forming a guard, saw plates and plate means clamped together and valve means disposed between said seat and guard.

3. In a pump mechanism, a water cooled cylinder head providing a central water cooled boss surrounded in co-axial relation thereto by an annular discharge chamber and having surrounding the latter an annular intake chamber, a cylinder, and valve mechanism for controlling communication between said cylinder and said intake and discharge chambers.

4. In a pump mechanism, a plurality of plates providing coaxial intake and discharge valve recesses, intake and discharge valve mechanisms in said recesses, a cylinder and a cylinder head between which said plates are disposed, said cylinder and cylinder head having annular cooling fluid jackets and said plates having passages for the cooling fluid extending therethrough.

5. In a pump mechanism, a plurality of plates providing intake and discharge valve recesses, intake and discharge valve devices in said recesses, a cylinder and a cylinder head between which said plates are disposed, said cylinder and cylinder head having annular cooling fluid jackets and said plates having passages for the cooling fluid extending therethrough and connecting the cylinder and head jackets.

6. In combination, in a valve mechanism, a combined inlet and discharge valve structure including a plate forming a valve seat, a plurality of coaxial plates forming another valve seat, one of said seats constituting an inlet valve seat and the other a discharge valve seat, said first mentioned plate forming a guard associated with the valve seat provided by said other plates, and valves cooperating with said seats.

7. In combination, in a valve mechanism, a combined inlet and discharge valve structure including a plate forming a valve seat, a plurality of coaxial plates forming another valve seat, one of said seats constituting an inlet valve seat and the other a discharge valve seat, one of said last mentioned plates forming a guard associated with the valve seat formed by the first mentioned plate, and valves cooperating with said seats.

8. In combination, in a valve mechanism, a plate forming a valve seat, a plurality of coaxial plates forming another valve seat, said first mentioned plate forming a guard associated with the valve seat provided by said other plates, and valves cooperating with said seats.

9. In combination, in a valve mechanism, a plate forming a valve seat, a plurality of coaxial plates forming another valve seat, one of said last mentioned plates forming a guard associated with the valve seat formed by the first mentioned plate, and valves cooperating with said seats.

FRANK A. HALLECK.

CERTIFICATE OF CORRECTION.

Patent No. 1,996,763.  April 9, 1935.

FRANK A. HALLECK.

It is hereby certified that error appears in the printed specification of the above numbered patent requiring correction as follows: Page 2, second column, line 7, claim 2, for "saw" read said; and line 8, same claim, after "together" insert a comma; and that the said Letters Patent should be read with these corrections therein that the same may conform to the record of the case in the Patent Office.

Signed and sealed this 11th day of June, A. D. 1935.

(Seal) Leslie Frazer
Acting Commissioner of Patents.